(12) United States Patent
Christianson et al.

(10) Patent No.: US 9,893,935 B2
(45) Date of Patent: Feb. 13, 2018

(54) DYNAMIC INFORMATION EXCHANGE FOR REMOTE SECURITY SYSTEM

(75) Inventors: Joel Curtis Christianson, Corcoran, MN (US); Gregory Brett Olson, Woodbury, MN (US)

(73) Assignee: Cinch Systems, Inc., St. Michael, MN (US)

( * ) Notice: Subject to any disclaimer, the term of this patent is extended or adjusted under 35 U.S.C. 154(b) by 0 days.

(21) Appl. No.: 13/372,256

(22) Filed: Feb. 13, 2012

(65) Prior Publication Data

US 2013/0212372 A1   Aug. 15, 2013

(51) Int. Cl.
*H04L 29/06* (2006.01)
*H04L 12/24* (2006.01)

(52) U.S. Cl.
CPC .......... *H04L 41/0806* (2013.01); *H04L 41/28* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 7,689,632 B2 | 3/2010 | Hogg | |
| 2005/0246408 A1* | 11/2005 | Chung | 709/200 |
| 2006/0123229 A1 | 6/2006 | Holloway et al. | |
| 2006/0232399 A1 | 10/2006 | Martin | |
| 2008/0083018 A1* | 4/2008 | Prokupets et al. | 726/4 |
| 2009/0070682 A1* | 3/2009 | Dawes et al. | 715/736 |
| 2009/0323904 A1* | 12/2009 | Shapiro et al. | 379/39 |
| 2010/0168874 A1* | 7/2010 | Lucas et al. | 700/17 |
| 2012/0124799 A1* | 5/2012 | Addy | 29/407.1 |

* cited by examiner

*Primary Examiner* — Jeffery Williams
(74) *Attorney, Agent, or Firm* — Schwegman Lundberg & Woessner, P.A.

(57) ABSTRACT

A system and method includes making a configuration change at a control panel in a security system. A message is encrypted with the configuration change and is automatically sent via a public network. The message is received at a receiver coupled to the public network and decrypted. A central controller database is then updated with the configuration change.

19 Claims, 6 Drawing Sheets

DYNAMIC INFORMATION EXCHANGE FOR REMOTE SECURITY SYSTEM

BACKGROUND

Security systems generally consist of a number of sensors coupled to a security panel. The security panel is programmed with configuration information regarding the sensors that are attached, including some indicator of the location of the sensors. This indicator can be a unique identifier, and may include a descriptive portion, such as describing a geographic location of the sensor to allow humans to easily understand the location of the sensor.

When sensors are initially installed and configured, as well as when sensors are added, a technician programs the security panel with the location indicator and type of sensor. Many panels may then be monitored remotely. The configuration information is generally then provided to a central controller that monitors many panels via telephone connection, or even via an internet connection in newer systems. However, the configuration information has been generally communicated to an operator at the central controller via facsimile, paper copy, or even via voice communications. This process of updating the central controller can introduce unnecessary delays in providing suitable remote monitoring of the status of the security panel and sensors attached, especially on first installation and when updating configuration information or adding or removing sensors.

SUMMARY

A system and method includes making a configuration change at a control panel in a security system. A message is encrypted with the configuration change and is automatically sent via a public network. The message is received at a receiver coupled to the public network and decrypted. A central controller database is then updated with the configuration change.

In one embodiment, a method includes receiving an automatically sent encrypted message via a public network identifying a configuration change at a control panel in a security system, decrypting the message, and updating a central controller database with the configuration change. This method may be incorporated into computer executable code stored on a computer readable storage device.

In a further embodiment, a system includes a plurality of security sensors, a control panel coupled to the sensors to receive encrypted data from the security sensors, and a connection module coupled to the panel and to an external public network to receive encrypted configuration information from the control panel and automatically send the encrypted configuration information over the public network to a remote control center. The system may also include a control center, a configuration information database coupled to the control center, and a receiver coupled to the control center and to the public network to receive and decrypt messages sent from the connection module.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, dynamic information exchange between a local control panel and a networked coupled central controller utilizes a virtual receiver at the central control panel. The virtual receiver provides for a continuous connection. The continuous connection results in local panel updates being dynamically changed in the central controller.

In some embodiments, encryption runs from sensors to the control panel and further through a TCP/IP module with AES encryption through the internet to the central controller. The continuous connection is now used with a virtual receiver at the central controller. This removes the time delay inherent in the prior methods of updating local panels that required faxing of a list of changes to a monitoring center for entry into the central controller.

Figure 1:
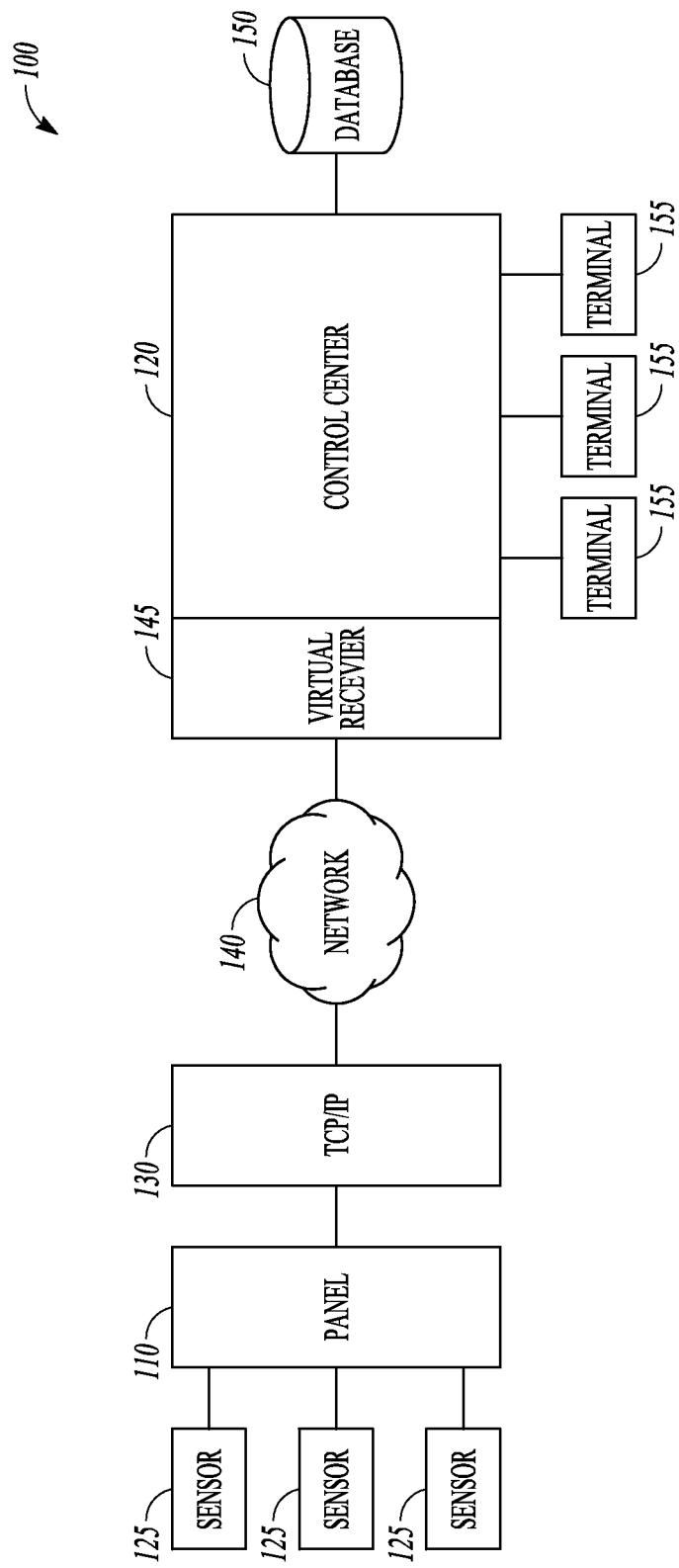
FIG. 1 is a block diagram of a security system having a local control panel and network coupled central controller according to an example embodiment.

FIG. 1 is a block diagram of an example security system 100 having a local control panel 110 and network coupled central controller 120. A plurality of sensors 125 may be coupled to the control panel 110. In some embodiments, the connection to the panel 110 is capable of carrying encrypted data between the sensors and control panel in either a wired or wireless manner. A TCP/IP module 130 is coupled to the panel 110 and provides a connection to a network 140 to facilitate communications between the panel and the network 140. These communications may also be encrypted in various embodiments using AES 128 or 256 bit encryption. Other levels of encryption may be provided in further embodiments.

The control center 120 is also coupled to the network 140, forming a virtual receiver 145 that receives communications from the panel 110 via the network 140. In some embodiments, the network is a public network, such as the Internet. Other networks may be utilized in further embodiments, including private networks and virtual networks. The control center 120 provides for a continuous connection, resulting in local panel updates being dynamically changed in the central controller 120 and stored in a database 150. One or more terminals 155 may be coupled to the control center 120 to assist with monitoring one or more security systems.

Figures 2, 3:
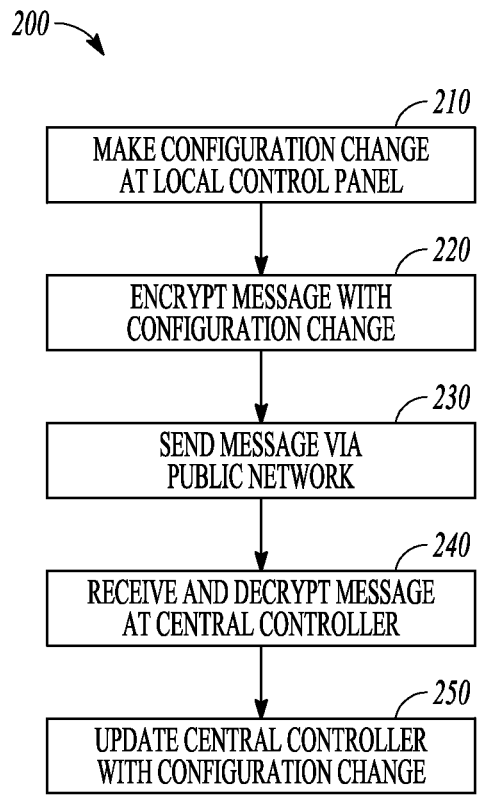
FIG. 2 is a flowchart illustrating a method of dynamically updating a central controller when changes are made at a panel level according to an example embodiment.
FIG. 3 is a block diagram of a data structure illustrating a message containing configuration change information according to an example embodiment.

FIG. 2 illustrates a method 200 of dynamically updating a central controller when changes are made at the panel level. At 210, a configuration change is made at the control panel in the security system. A message is encrypted with the configuration change at 220, identifying that a new zone has been added along with a panel ID or serial number where the zone was added. The environment being monitored may be a secure facility, including grounds around the facility, such as vehicle barriers. At 230, the message is sent automatically via the network. The central controller receives the message at 240 and decrypts the message.

In various embodiments, the message may simply identify that a zone has been changed or added, along with an identification of the panel where the zone was added. If such a message is received, the central controller may then request further information from the panel, including the serial number of a module where a sensor or switch has been added, along with an identification of the particular connections where the switch was added, a human readable name for the zone, such as back stairway, basement rec room, etc. The further information may also include the type of switch and various behaviors of the switch such as whether the zone is a burglary zone, a fire zone, if there is a delay, and when the switch is active, such as 24 hours, or only when a system is armed.

The further information is also encrypted and sent as a message. The received message is parsed to obtain the information from the message identifying the configuration change and where to record the information change in the database. At 250, the central controller updates the database with the configuration change. The database may be used to assist an operator at the central controller in assessing threats. In some embodiments, the central controller may interact with the panel 110 to turn off alarms, operate actuators such as vehicle barriers and transfer desired control operations from the panel to the control center. In further embodiments, all the information may be sent in the first message without the need for a further message or messages.

FIG. 3 is a diagram illustrating a simplified message 300 containing one example of configuration change information sent over the network 140. In various embodiments, the message 300 includes a location of an environment being monitored 310, sensor ID 320, and a description of the location of the sensor at 330. The environment may be identified by a code, name, or address. A code may be used to index into the database to find the appropriate field or fields to be modified with the configuration change. In further embodiments, the message 300 may contain further information as described above, and may include a preliminary message identifying a change followed by a message sent on request of the central controller containing further details regarding the configuration changes.

Figure 4:
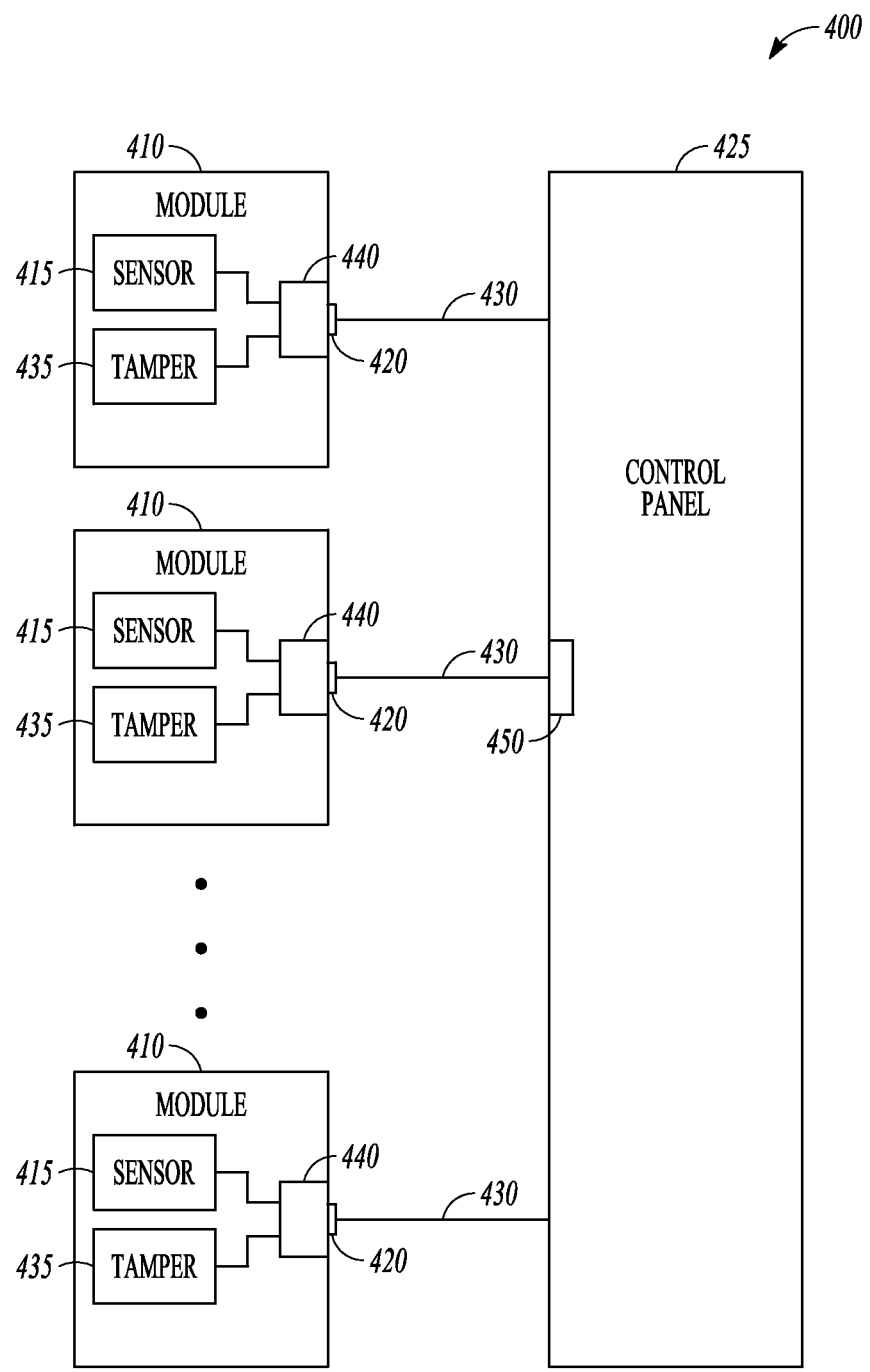
FIG. 4 is a block diagram of an intrusion detection system according to an example embodiment.

Further details of an alternative intrusion detection system 400 are illustrated in block diagram form in FIG. 4. A plurality of modules 410 have sensors 415 to monitor for intrusion, and also have a port 420. At least one control panel 425 is coupled to the module ports 420 via wires 430. Communications over the wires 430 are encrypted. The sensors 415 are encapsulated within the modules 410 and coupled to the port 420. Each module includes at least one tamper sensor 435 to detect attempts to tamper with the module.

In one embodiment, each module includes a protected space that is protected against tampering to ensure security of communications from the sensors to the control panel. The port includes a circuit board 440 having encryption functions to encrypt sensor readings. In some embodiments, the circuit board 440 is housed within the protected space within the module 410. The circuit board 440 provides serial two wire differential communications via the port 420 in some embodiments. In one embodiment, the circuit board provides 16 bytes of data for every communication.

The circuit board 440 in one embodiment encrypts tamper information generated by tamper detection sensors 435 when attempts to tamper with the module 410 are detected. The circuit board 440 has a header to connect to components within the module, wherein the header includes pins for a supply voltage, ground, sensor value, and one or more tamper switches. The circuit board 440 is adapted to couple to a supply voltage, such as a battery or external power supply, ground, and A and B channels of the two wire differential communication wire. The circuit board 440 may be potted in epoxy, and in some embodiments has a header that pins may be slid into to communicate with the circuit board. The header may include a power supply connection, ground, zone, and multiple tamper connections. The zone corresponds to the type of intrusion or parameter being detected, such as a motion, contact switch, etc. In further embodiments, the header includes a supply connection, such as 12V supply, ground, and a 485 differential connection. The encryption provided may be AES 128 bit encryption in one embodiment.

In one embodiment, the modules 410 may include a door switch sensor, motion detector sensor, keypad, and other modules. Communications between the modules and the control panel are encrypted. Enclosing the circuit board 140 within the modules in combination with the module tamper detection, significantly reduces the vulnerability to tampering going undetected due to the encryption of communications between the module and the control panel. In some embodiments, the wired connection may be formed by individual lines from each module to the control panel, or may include a control panel bus, with each module coupled to the bus. In further embodiments, communications between the modules and control panel may be by encrypted wireless transceivers, also represented at 420 and 440 in the modules and at 450 in control panel 425.

Figure 5:
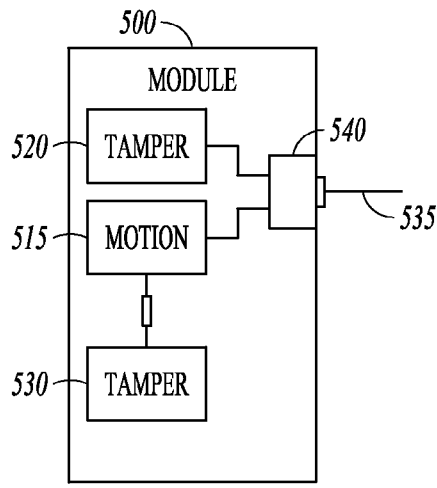
FIG. 5 is a block diagram of a motion detection module according to an example embodiment.

An example module 500 in FIG. 5 is a tamper resistant motion detector module. Inside the module 500 are two switches 515 and 520. Switch 515 is a motion detection switch coupled to an opening or lens 525. Motion detection switch 515 changes state to indicate the presence or absence of motion. Switch 520 is a tamper detection switch to make sure the motion detector module 500 is not tampered with. Tampering is detected when the module is removed from a mounting or has a cover opened. In one embodiment, an addition tamper detection switch 530 changes state if an attempt is made to mask the detection of motion by covering the lens 525.

Figure 6:
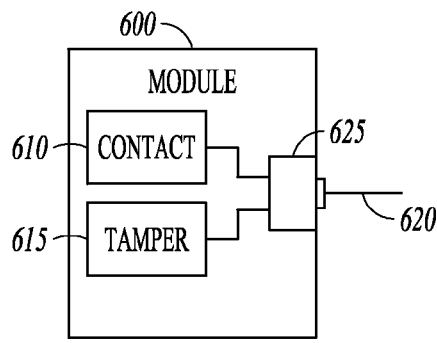
FIG. 6 is a block diagram of a contact detection module according to an example embodiment.

An example door/window contact module 600 in FIG. 6 operates in a manner similar to module 500. A contact detector switch 610 is used to detect the opening or closing of a door or window being protected. A tamper detection switch 615 is used to indicate if someone is trying to tamper with the detector switch by physical or magnetic manipulation.

In FIGS. 5 and 6, wires 435 and 520 respectively, indicate the state of the detectors by the voltages on the switches. Each of the wires leaving the module in one embodiment is coupled to an input module 540, 625 inside the modules 500 and 600 respectively. The input modules 540, 625 correspond to circuit board 440 in FIG. 4, and encrypt the signals on the wires, which may be coupled to a control panel in one embodiment. The input modules providing the encrypting lay inside the area of the modules 500 and 600 that are protected by the tampering protection switches. Since the sensing modules also lie within the protected area of the modules, unencrypted signals within the modules 500 and 600 may not be interfered, modified, or eavesdropped on without first tripping a tamper switch. The tripping of a tamper switch may result in a notice or alarm being generated by the control panel.

Figure 7:
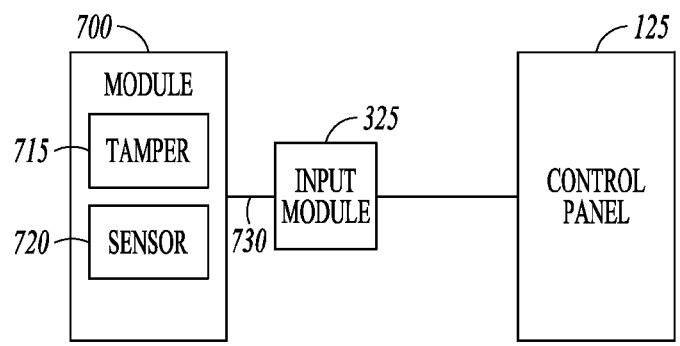
FIG. 7 is a block diagram of an alternative detecting device according to an example embodiment.

In some embodiments, when the detecting device is too small to allow mounting of a miniature input module inside a detector module, an input module may be placed as close to the detector switch as possible, minimizing the length of wires carrying unencrypted signals. An example of such a module is shown at 700 in FIG. 7, coupled to a control panel 710. The module 700 includes a tamper detection switch 715 and a sensor switch 720, both coupled to an input module 725 by a short length of wire 730. Input module 725 encrypts signals from module 700 before providing them to control panel 710. Wire or wires 730 may be very short, such as 1 cm or less in some embodiments to reduce the ability to detect signals on the wire, and as short as possible given the environment in which the detector module is being used.

Figure 8:
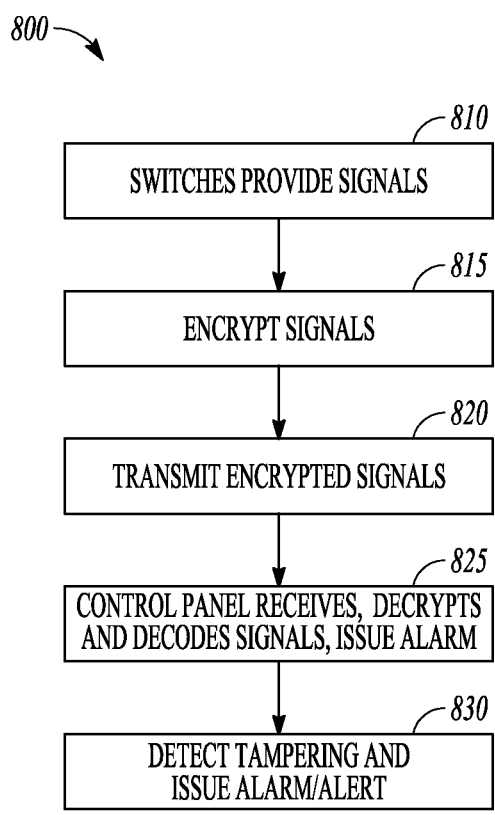
FIG. 8 is a flow chart illustrating a method of detecting alarm and tamper conditions according to an example embodiment.

In one embodiment, the detection system 400 implements a method illustrated in flow chart form at 800 in FIG. 8. At 810, switches in a module provide signals to the circuit board. The switches correspond to the parameter being sensed, such as motion, or a contact, as well as one or more signals representative of tampering. At 815, the signals are encrypted by the circuit board and provided external to the module via wired or wireless transmission at 820. The signals are received by the control panel at 825, decrypted, and decoded to determine whether an alarm or alert should be issued. The alarm or alert may be issued as a function of motion or opening of a door or window, or one of many sensed parameters for the different types of modules. The control panel at 830 detects whether one or more tamper switches are signaling a tamper event, and can also issues alarms or alerts representative of tampering, and in some embodiments, the type of tampering represented by the signals from different tampering switches.

Figure 9:
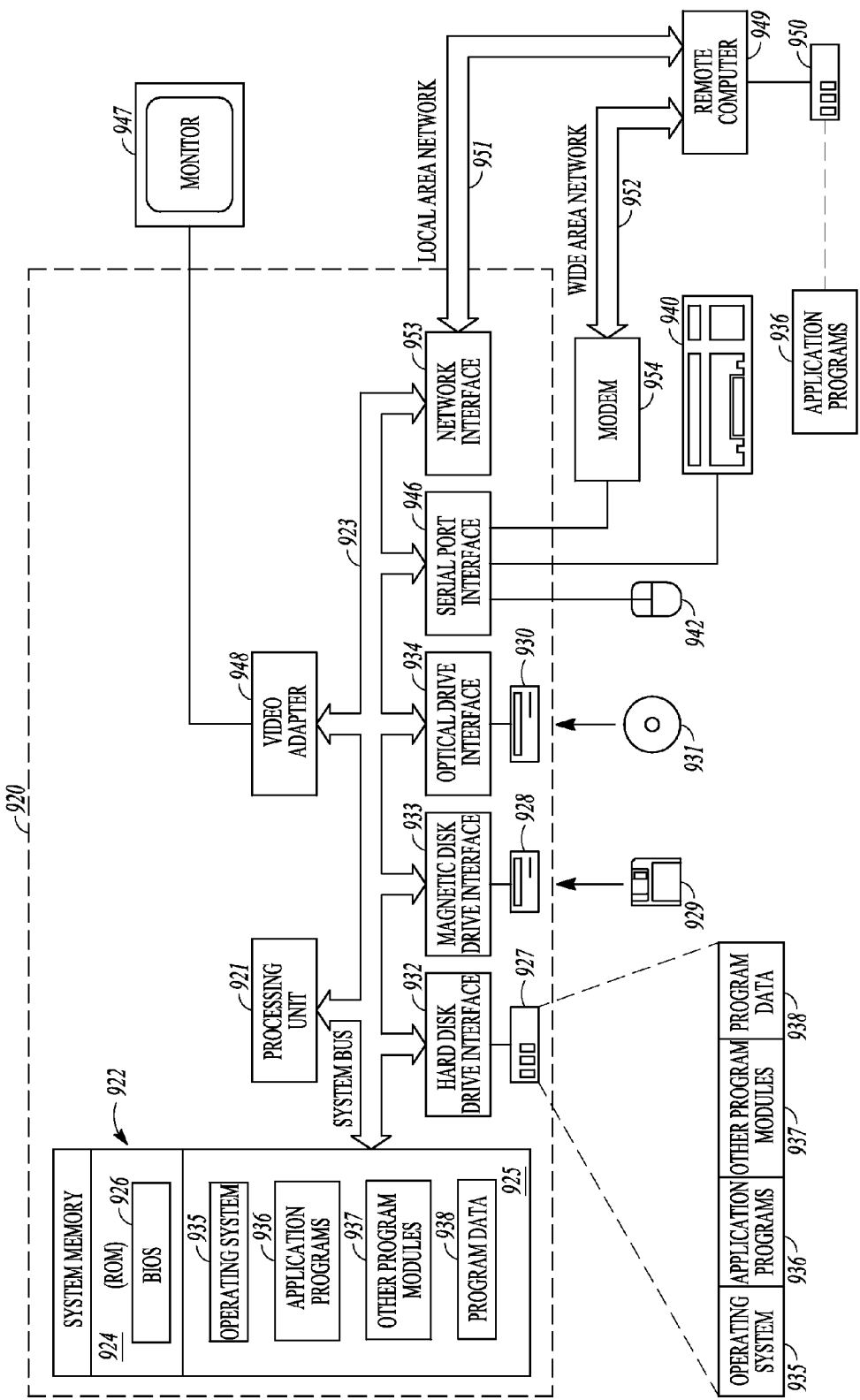
FIG. 9 is a block diagram of an example computer system for implementing one or more methods or functions according to an example embodiment.

FIG. 9 is a block diagram of a computer system to implement methods according to an example embodiment. In the embodiment shown in FIG. 9, a hardware and operating environment is provided that is applicable to any of the servers and/or remote clients shown in the other Figures.

As shown in FIG. 9, one embodiment of the hardware and operating environment includes a general purpose computing device in the form of a computer 900 (e.g., a personal computer, workstation, or server), including one or more processing units 921, a system memory 922, and a system bus 923 that operatively couples various system components including the system memory 922 to the processing unit 921. There may be only one or there may be more than one processing unit 921, such that the processor of computer 900 comprises a single central-processing unit (CPU), or a plurality of processing units, commonly referred to as a multiprocessor or parallel-processor environment. In various embodiments, computer 900 is a conventional computer, a distributed computer, or any other type of computer.

The system bus 923 can be any of several types of bus structures including a memory bus or memory controller, a peripheral bus, and a local bus using any of a variety of bus architectures. The system memory can also be referred to as simply the memory, and, in some embodiments, includes read-only memory (ROM) 924 and random-access memory (RAM) 925. A basic input/output system (BIOS) program 926, containing the basic routines that help to transfer information between elements within the computer 900, such as during start-up, may be stored in ROM 924. The computer 900 further includes a hard disk drive 927 for reading from and writing to a hard disk, not shown, a magnetic disk drive 928 for reading from or writing to a removable magnetic disk 929, and an optical disk drive 930 for reading from or writing to a removable optical disk 931 such as a CD ROM or other optical media.

The hard disk drive 927, magnetic disk drive 928, and optical disk drive 930 couple with a hard disk drive interface 932, a magnetic disk drive interface 933, and an optical disk drive interface 934, respectively. The drives and their associated computer-readable media provide non volatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 929, optical disk 931, ROM 924, or RAM 925, including an operating system 935, one or more application programs 936, other program modules 937, and program data 938. Programming for implementing one or more processes or method described herein may be resident on any one or number of these computer-readable media.

A user may enter commands and information into computer 900 through input devices such as a keyboard 940 and pointing device 942. Other input devices (not shown) can include a microphone, joystick, game pad, satellite dish, scanner, or the like. These other input devices are often connected to the processing unit 921 through a serial port interface 946 that is coupled to the system bus 923, but can be connected by other interfaces, such as a parallel port, game port, or a universal serial bus (USB). A monitor 947 or other type of display device can also be connected to the system bus 923 via an interface, such as a video adapter 948. The monitor 947 can display a graphical user interface for the user. In addition to the monitor 947, computers typically include other peripheral output devices (not shown), such as speakers and printers.

The computer 900 may operate in a networked environment using logical connections to one or more remote computers or servers, such as remote computer 949. These logical connections are achieved by a communication device coupled to or a part of the computer 900; the invention is not limited to a particular type of communications device. The remote computer 949 can be another computer, a server, a router, a network PC, a client, a peer device or other common network node, and typically includes many or all of the elements described above 110 relative to the computer 900, although only a memory storage device 950 has been illustrated. The logical connections depicted in FIG. 9 include a local area network (LAN) 951 and/or a wide area network (WAN) 952. Such networking environments are commonplace in office networks, enterprise-wide computer networks, intranets and the internet, which are all types of networks.

When used in a LAN-networking environment, the computer 900 is connected to the LAN 951 through a network interface or adapter 953, which is one type of communications device. In some embodiments, when used in a WAN-networking environment, the computer 900 typically includes a modem 954 (another type of communications device) or any other type of communications device, e.g., a wireless transceiver, for establishing communications over the wide-area network 952, such as the internet. The modem 954, which may be internal or external, is connected to the system bus 923 via the serial port interface 946. In a networked environment, program modules depicted relative to the computer 900 can be stored in the remote memory storage device 950 of remote computer, or server 949. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. A method comprising:
    making a configuration change at a control panel in a security system having control panel connections to couple to multiple sensors, the configuration change comprising a data structure having fields corresponding to information being updated in the control panel, the data structure identifying a location and a type of a newly added security system sensor, a database index code, and an identification of a particular control panel connection where the sensor was added;
    encrypting a message via the control panel with the updated information from the fields of the data structure;
    automatically sending the message from the control panel responsive to the configuration change at the control panel via a public network;
    receiving the message at a receiver coupled to the public network;
    decrypting the message to obtain the updated information; and
    updating a central controller database with the updated information corresponding to the configuration change by using the database index code to index into the database to identify a database field to change.

2. The method of claim 1 wherein the encrypted message identifies a sensor and a location of the sensor, and wherein the message is sent via a connection to a receiver over the public network.

3. The method of claim 2 wherein the encrypted message identifies an environment where the control panel and sensor are located.

4. The method of claim 2 wherein the encrypted message identifies the sensor as a contact switch connected to the control panel via two wires.

5. The method of claim 1 wherein the message is sent via a TCP/IP connection to the Internet.

6. The method of claim 1 and further comprising parsing the received message to obtain information from the message identifying the configuration change and where to record the information change in the database.

7. A computer readable storage device having computer executable instructions for causing a computer to implement a method comprising:
    receiving, from a control panel responsive to a configuration change being made at the control panel, wherein the configuration change represents location and sensor type information of a newly added sensor, a code, and an identification of particular control panel connections where the sensor was added, an automatically sent encrypted message via a public network identifying a configuration change at a control panel in a security system;
    decrypting the message; and
    updating a central controller database with the configuration change by using the code to index into the database to identify a database field to change.

8. The computer readable storage device of claim 7 wherein the encrypted message identifies a sensor and a location of the sensor.

9. The computer readable storage device of claim 8 wherein the encrypted message identifies an environment where the control panel and sensor are located.

10. The computer readable storage device of claim 8 wherein the encrypted message identifies the sensor as a contact switch.

11. The computer readable storage device of claim 7 wherein the message is sent via a TCP/IP module to the Internet.

12. The computer readable storage device of claim 7 wherein the message is received and parsed to obtain information from the message identifying the configuration change and where to record the information change in the database.

13. A system comprising:
    a plurality of security sensors;
    a security system control panel coupled to the sensors via control panel connections, and configured to receive encrypted data from the security sensors and generate encrypted information regarding a configuration change responsive to the configuration change, the configuration change comprising a data structure having fields corresponded to information regarding a location and a type of a newly added sensor, a database indexing code identifying a location in a database in which to store the information, and an identification of particular control panel connections where the sensor was added; and
    wherein the security system control panel is coupled to an external public network and automatically sends the encrypted configuration information via a network connection over the public network to a remote control center.

14. The system of claim 13 wherein the security system control panel utilizes a TCP/IP connection to the Internet to encapsulate the configuration information into a message that is sent over the Internet to the remote control center.

15. The system of claim 14 wherein the encrypted message identifies a sensor and a location of the sensor.

16. The system of claim 14 wherein the encrypted message identifies an environment where the control panel and sensor are located.

17. The system of claim 14 wherein the encrypted message identifies the sensor as a contact switch coupled to the security system control panel via a two wire connection.

18. The system of claim 13 and further comprising:
   a control center;
   a configuration information database coupled to the control center; and
   a receiver coupled to the control center and to the public network to receive and decrypt messages sent from the security system control panel.

19. The system of claim 18 wherein the receiver is configured to parse the message to obtain information from the message identifying the configuration change and where to record the information change in the database.

* * * * *